March 31, 1942.  H. A. PEDERSEN  2,278,018
POWER TRANSMISSION DEVICE
Filed July 28, 1939  3 Sheets-Sheet 1
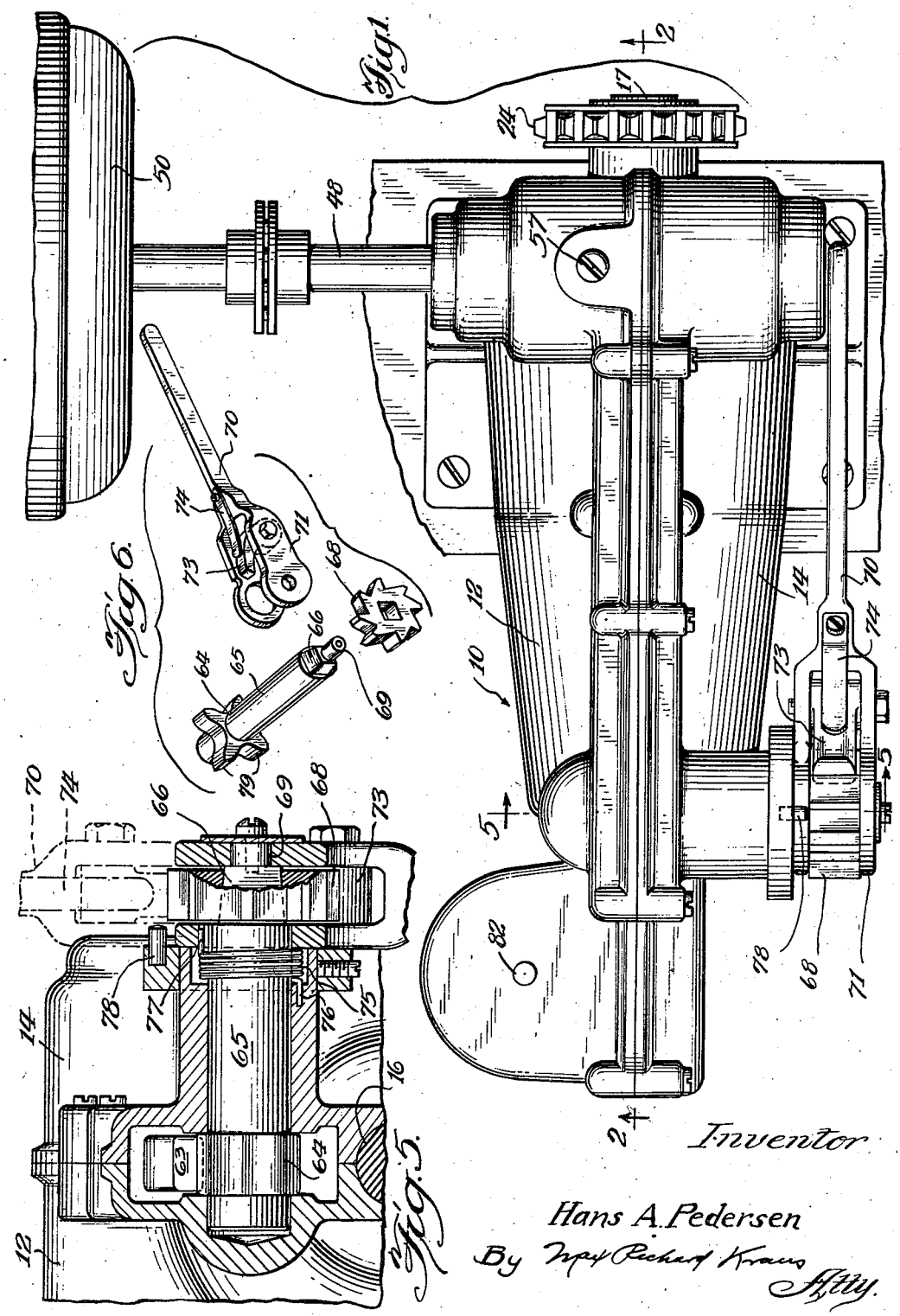
Inventor
Hans A. Pedersen
By Richard Kraus
Atty.

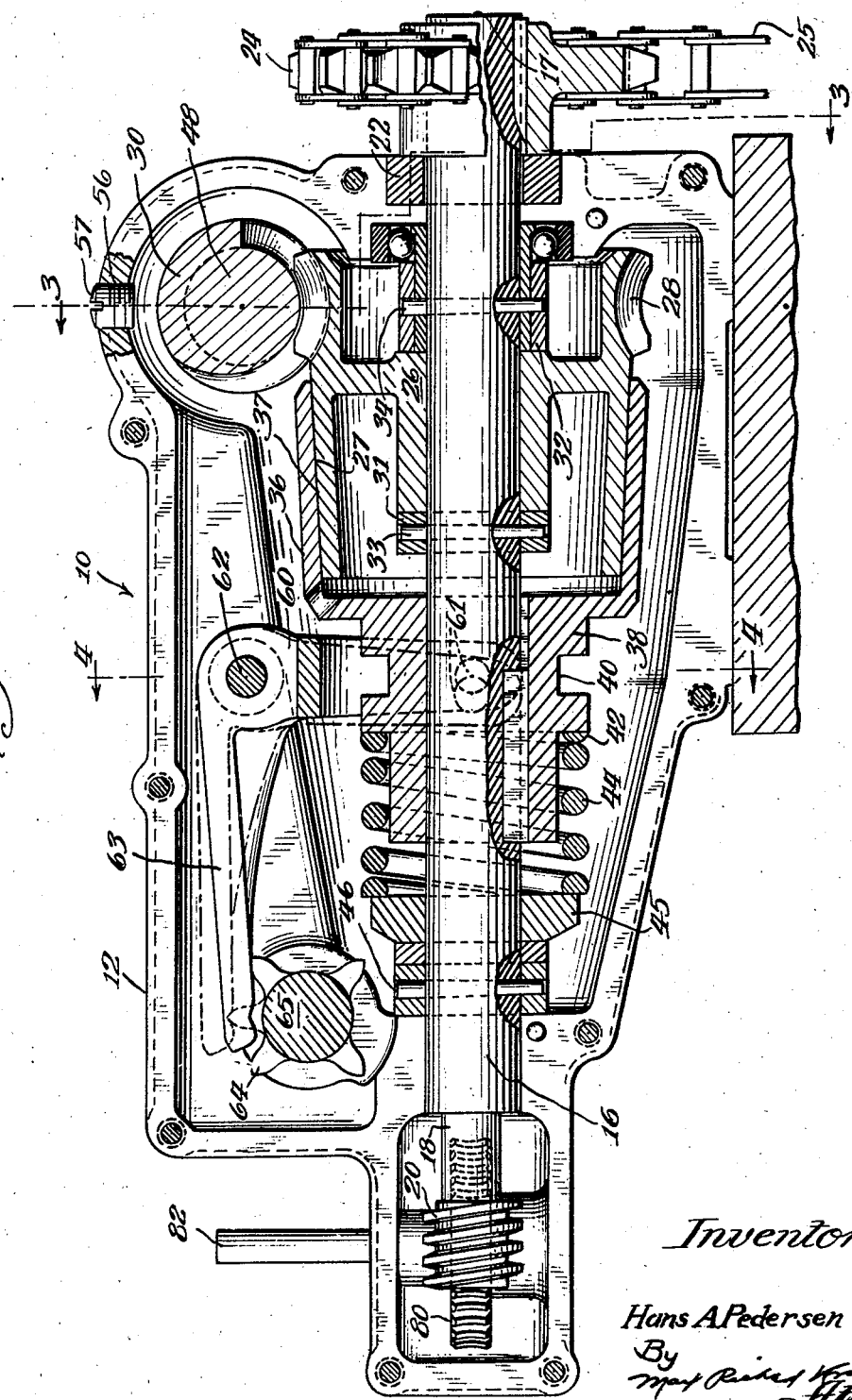

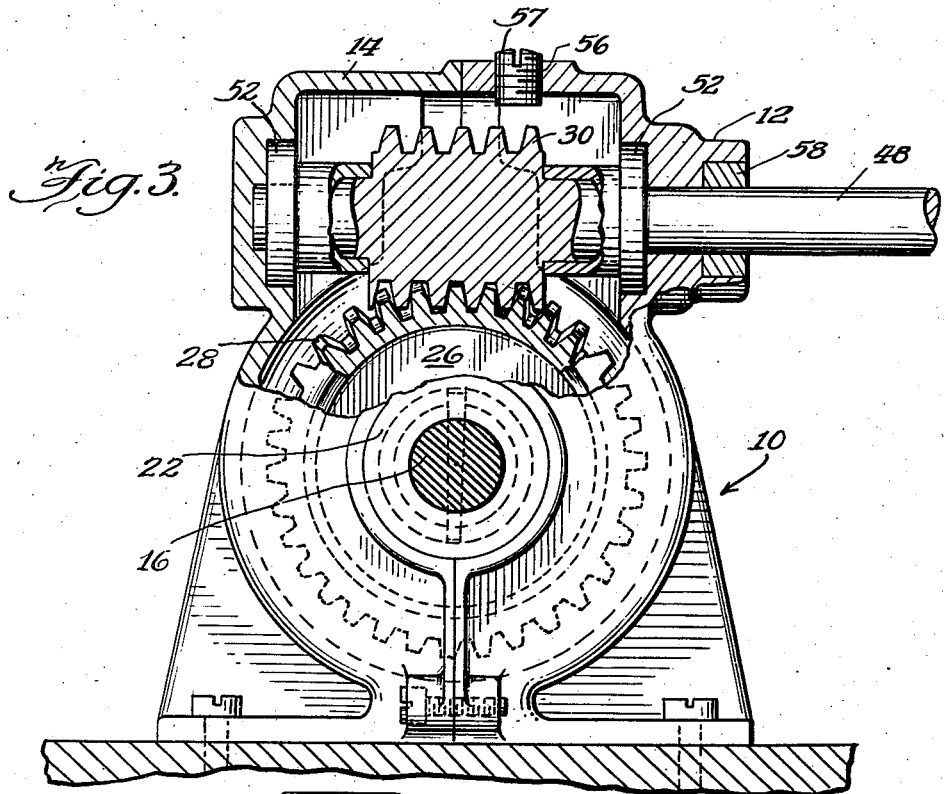
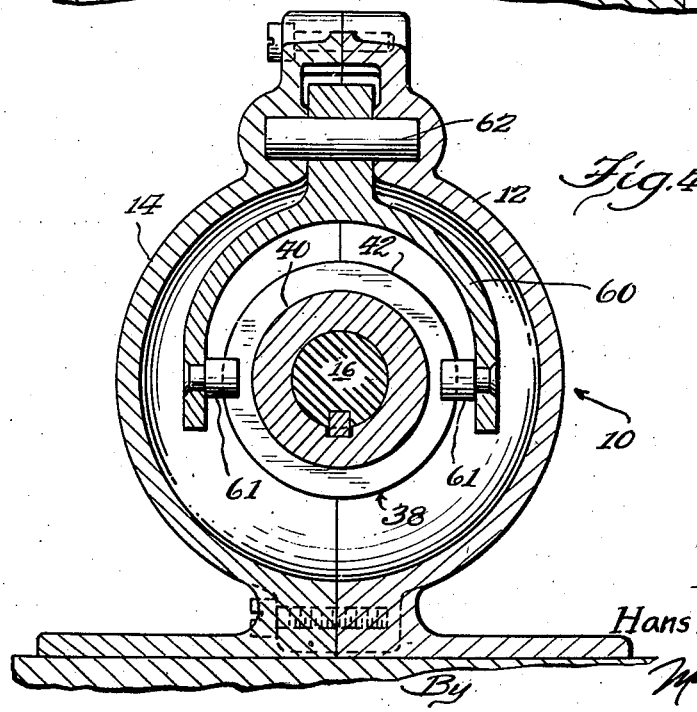

Patented Mar. 31, 1942

2,278,018

UNITED STATES PATENT OFFICE 2,278,018

POWER TRANSMISSION DEVICE

Hans A. Pedersen, Chicago, Ill.

Application July 28, 1939, Serial No. 287,044

2 Claims. (Cl. 74—428)

This invention relates to power transmission devices generally, and more particularly to a coupling and clutch means which will automatically yield to a predetermined condition of overload.

The present invention finds particular application in an apparatus in which a timing device is associated with a power source and clutch means, for the purpose of automatically controlling the operation of a driven object and in which apparatus it is required that the driven object and timing device shall be in continuous positive synchronization.

An exampe of a suggested use of my invention would be in connection with a power driven slidable door wherein it is required to have the door operating mechanism in positive engageable relationship with the timing device, so that, should the clutch means yield to a condition of overload, the movement of the timing device would yet at all times remain synchronized with the movement of the door.

It is therefore an object of this invention to provide a coupling and clutch means which is automatically operable to yield to a predetermined condition of overload.

Another object of this invention is the provision of a coupling and clutch means which is automatically yieldable to a predetermined condition of overload and which is adapted to be operable in association with a timing means, the latter being in positive engageable relationship with the driven apparatus, such that, regardless of the yielding of the clutch means, the movement of the timing means is in permanent synchronization with the movement of the driven apparatus.

A further object of this invention is the provision of a compact unit serving as an automatic clutch and speed reducer.

A still further object of this invention is the provision of a coupling and clutch means which is automatically yieldable to a predetermined condition of overload, and which is provided with manually operable means for selectively setting said clutch means in operable and non operable positions.

With the foregoing and other object in view, the invention further consists of the following novel features and details of construction to be hereinafter more fully described, and illustrated in the accompanying drawings, in which Fig. 1 is a plan view of my device shown coupled to an electric motor.

Fig. 2 is a longitudinal elevational view partly in cross section looking in the direction indicated by the arrows 2—2 of Fig. 1.

Fig. 3 is a cross sectional view taken on line 3—3 of Fig. 2.

Fig. 4 is a cross sectional view taken on line 4—4 of Fig. 2.

Fig. 5 is an enlarged partial cross sectional view taken on line 5—5 of Fig. 1.

Fig. 6 is a perspective view of details in disassembled relationship.

In the drawings, wherein for the purpose of illustration, is shown a preferred embodiment of my invention, the numeral 10 designates, generally, a housing which is formed of two sections 12 and 14. Rotatably mounted in suitable bearings, in said housing, and extending longitudinally thereof, is a drive shaft 16 having, at one end, a reduced portion 18, upon which is rigidly mounted a worm gear. The opposite end 17 of said shaft 16 projects through an oil seal 22 mounted at the end of the housing and is adapted to accommodate a sprocket wheel 24 which is keyed to the shaft 16 for rotation therewith. It will be seen that the shaft 16, worm gear 20 and sprocket wheel 24 are rotatable as a unit.

Rotatably mounted on the shaft 16 is a clutch member 26 having a tapered clutch engaging surface 27. Integrally formed with said clutch member is worm wheel 28 which meshes with the worm gear 30, presently to be described. The clutch member 26 is secured against axial movement, on the shaft 16, by the collars 31 and 32 which are fixedly mounted on the shaft 16 by the pins 33 and 34 respectively.

A complementary clutch member 36 having a tapered bore, forming a clutch engaging surface 37, is keyed on the shaft 16, for axial movement thereon, and is coaxially mounted with the clutch member 26 for engageable relation therewith. Said clutch member is provided with an elongated hub portion 38 in which is formed an annular recess 40. The shoulder 42 on the hub portion 38 serves as an abutment for the compression spring 44 which is interposed between said shoulder and a collar 45, said collar being mounted on the shaft 16 abutting a ring member held by a pin 46 and serving as an abutment for the opposite end of the spring 44. The spring 44 normally maintains the clutch members 26 and 36 in engageable relation and is arranged to balance the predetermined load which the clutch is to transmit, but is yieldable, at a certain condition of overload, whereby the clutch engaging surfaces 27 and 37 are caused to slip on each other and prevent damage to the driving means and clutch mechanism.

A drive shaft 48 arranged for coupling to an electric motor 50, or other suitable driving means, is rotatably mounted in roller bearings 52 at right angles to the shaft 16 and has a worm gear 30 fixed thereon, for rotation therewith. The worm gear 30 engages the worm wheel 28 for driving the clutch member 26. It will be seen that the gear ratio of the worm gear 30 and worm wheel 28 is such that a reduction in speed is effected in the rotation of the worm wheel.

An aperture 56, for lubricating purposes, is provided in the housing and has associated therewith a screw plug 57 for closing same. An oil seal 58 through which the shaft 48 projects serves to prevent the escape of lubricant from the housing.

Referring particularly to Figs. 2 and 4, a yoke member 60 is provided with rotatable elements 61 which engage the annular recess 40 of the clutch member 26.

The yoke member 60 is pivotally mounted on a pin 62 and is provided with a rigid arm 63 which extends at right angles to the yoke member. It is seen that a pivotal actuation of the yoke member 60 effects an axial movement of the clutch member 36 on the shaft 16, whereby the clutch surfaces 27 and 37 are disengaged and the clutch member 26 is rotated independently of the complementary clutch member 36.

A cam member 64 is mounted on a shaft 65 which is suitably journaled, in the housing, and is adapted to engage the arm 63 of the yoke member 60 for pivotally moving said yoke member. The shaft 65 is squared, as at 66, for receiving a ratchet wheel 68 and has a reduced end portion 69 for accommodating the actuating lever 70 which is rotatably mounted thereon. The actuating lever 70 has a U-shaped end portion 71 in which is pivotally mounted a pawl member 73. In assembled relationship the ratchet wheel 68 is disposed between the legs of the U shaped portion 71 and is engageable by the pawl 73 which is normally retained in engagement with said ratchet wheel by a spring member 74.

A torsion spring 75 anchored, at one end, in the housing, as at 76, and at the other end, in the leg of the actuating lever 70, as at 77, serves to return the lever 70 to normal position. A pin 78 anchored in the housing serves as a stop to limit the pivotal movement of the actuating lever 70.

In the embodiment, illustrated in the drawings, the cam member 64 is provided with four engageable surfaces 79. It is thus seen, that a 45 degree movement of the lever 70 will actuate the yoke member 60 to move the clutch engaging surfaces 27 and 37 into or out of engagement with each other.

A worm wheel 80 is mounted in engageable alinement with the worm gear 20 and serves to drive a shaft 82 which is associated with timing means, not shown.

In operation, with the yoke member 60 and arm 63 normally assuming the position illustrated by the solid lines in Fig. 2, the clutch surfaces 27 and 37 are held in frictional engagement by the spring 44. Power is thereby transmitted from the motor 50 through the drive shaft 48 and clutch members 26 and 36 to the shaft 16 to drive the sprocket wheel 24 and worm gear 20 which rotate with the shaft 16. It is through the shaft 16 that the power is transmitted for driving any desired apparatus. While a sprocket wheel 24 and chain 25 are shown, it is understood, that any positive power transmission means as for example, gears, may be used instead.

If the driven apparatus, not shown, should become stalled or overloaded, so as to exceed the normal driving torque which is normally balanced by the force exerted longitudinally by the spring 44, then the clutch engaging surfaces 27 and 37 are caused to slip on each other to permit the clutch member 26 to rotate on the shaft 16 while the complementary clutch member 36 which is associated with the driven apparatus remains stationary.

It is thus seen that even should the clutch engaging surfaces slip on each other, because of the positive association of the driven apparatus with timing means, the relationship between the movement of the driven apparatus and the timing means is not disturbed but remains in permanent synchronization.

If it is desired to set the device so that no power is transmitted through the clutch members, the actuating lever 70 is pivotally moved to rotate the cam member 64 and to bring a cam surface 79 into contact with the arm 63 of the yoke member 60. This causes the yoke member 60 to be rocked about its pivot 62 and to assume a position illustrated by the dotted lines in Fig. 2. It is seen that the yoke member 60 has thus shifted the clutch member 36 to the left and has caused the clutch surfaces 27 and 37 to become disengaged thereby permitting independent rotation of the clutch member 26.

To again effect a transmission of power, the actuating lever 70 is rocked to rotate the shaft 65 and cam member 64 so that the arm 63 is out of engagement with any of the cam surfaces 79, as is shown by the solid lines in Fig. 2. In this position, the tension of the spring 44 is directed against the clutch member 36 and the clutch surfaces 27 and 37 are caused to be engaged whereby a transmission of power is effected.

It is to be understood that the form of my invention, herewith shown and described, is to be taken as a preferred example of the same, and that various changes in the shape, size and arrangement of parts may be resorted to, without departing from the spirit of my invention or the scope of the appended claims.

I claim:

1. In a device of the class described, a driving shaft adapted for coupling to a source of power, a worm on said driving shaft and rotatable therewith, a driven shaft, a clutch member rotatably mounted on said driven shaft, means on said shaft for retaining said clutch member against axial movement, said clutch member having a tapered clutch engaging surface and being fixedly associated with a worm wheel in engagement with said worm, a complementary clutch member having a tapered clutch engaging surface to fit said first mentioned clutch engaging surface, said complementary clutch member being mounted on said driven shaft for rotation therewith but being axially movable thereon, spring means reacting on said driven shaft and bearing with yieldable pressure against said complementary clutch member for retaining said complementary clutch member and gear associated clutch member in engagement under normal load, a pair of driving elements for operating independent mechanisms fixed on said driven shaft, the relative operation of the independent mechanisms driven by each of said driving elements being thereby in synchronism under all conditions of operation of said device.

2. In a device of the class described, a driving shaft adapted for coupling to a source of power, a worm on said driving shaft and rotatable therewith, a driven shaft, a clutch member rotatably mounted on said driven shaft, means on said shaft for retaining said clutch member against axial movement, said clutch member having a tapered clutch engaging surface and being fixedly associated with a worm wheel in engagement with said worm, a complementary clutch member having a tapered clutch engaging surface to fit said first mentioned clutch engaging surface, said complementary clutch member being mounted on said driven shaft for rotation therewith but being axially movable thereon, spring means reacting on said driven shaft and bearing with yieldable pressure against said complementary clutch member for retaining said complementary clutch member and gear associated clutch member in engagement under normal load, said complementary clutch member having a manually operable means operatively connected therewith for axially moving said complementary clutch member whereby said clutch members are selectively moved into engageable and non-engageable relation, a pair of driving elements for operating independent mechanisms fixed on said driven shaft, the relative operation of the independent mechanisms driven by each of said driving elements being thereby in synchronism under all conditions of operation of said device.

HANS A. PEDERSEN.